(12) United States Patent
Parker et al.

(10) Patent No.: US 9,383,496 B2
(45) Date of Patent: Jul. 5, 2016

(54) EDGE LIT LIGHTING ASSEMBLY WITH SPECTRUM ADJUSTER

(71) Applicant: Rambus Delaware LLC, Brecksville, OH (US)

(72) Inventors: Jeffery R. Parker, Richfield, OH (US); Timothy A. McCollum, Avon Lake, OH (US); Michael D. Mayer, Strongsville, OH (US)

(73) Assignee: Rambus Delaware LLC, Brecksville, OH (US)

( * ) Notice: Subject to any disclaimer, the term of this patent is extended or adjusted under 35 U.S.C. 154(b) by 319 days.

(21) Appl. No.: 13/905,295

(22) Filed: May 30, 2013

(65) Prior Publication Data
US 2013/0322115 A1   Dec. 5, 2013

Related U.S. Application Data

(60) Provisional application No. 61/655,675, filed on Jun. 5, 2012.

(51) Int. Cl.
| | |
|---|---|
| *F21V 9/00* | (2015.01) |
| *F21V 8/00* | (2006.01) |
| *F21V 9/16* | (2006.01) |
| *F21V 9/10* | (2006.01) |
| *F21V 14/08* | (2006.01) |

(52) U.S. Cl.
CPC ............... *G02B 6/0013* (2013.01); *F21V 9/10* (2013.01); *F21V 9/16* (2013.01); *G02B 6/0011* (2013.01); *G02B 6/0023* (2013.01); *F21V 14/08* (2013.01)

(58) Field of Classification Search
CPC .. G02B 6/0013; G02B 6/0023; G02B 6/0011; G02B 6/0026; F21V 9/16; F21V 9/08; F21V 9/10; F21V 14/08

USPC ......... 362/277, 280–284, 293, 319, 621–622, 362/627

See application file for complete search history.

(56) References Cited

U.S. PATENT DOCUMENTS

| | | | | |
|---|---|---|---|---|
| 2,681,946 A | * | 6/1954 | Leverenz | H04N 9/22 348/742 |
| 4,667,036 A | * | 5/1987 | Iden | C08K 5/3437 257/E31.129 |
| 5,077,161 A | * | 12/1991 | Law | C09B 35/34 399/159 |
| 5,241,170 A | * | 8/1993 | Field, Jr. | A61B 1/0638 250/214 VT |
| 5,535,230 A | * | 7/1996 | Abe | F21K 9/00 250/504 R |
| 5,664,862 A | | 9/1997 | Redmond et al. | |

(Continued)

FOREIGN PATENT DOCUMENTS

| | | |
|---|---|---|
| JP | 06222363 | 8/1994 |
| JP | 2005222750 A * | 8/2005 |
| JP | 2010-238449 A | 10/2010 |

OTHER PUBLICATIONS

International Search Report and Written Opinion dated Aug. 27, 2013 in International Application No. PCT/US13/043509. 10 pages.

*Primary Examiner* — Jason Moon Han
(74) *Attorney, Agent, or Firm* — Renner, Otto, Boisselle & Sklar, LLP

(57) ABSTRACT

A lighting assembly comprises a light source and a light guide having a light input edge and a light output surface. Light from the light source enters the light input edge and is propagated within the light guide by total internal reflection. A spectrum adjuster is adjustable or selected to achieve a desired spectrum of the light within the light guide.

39 Claims, 9 Drawing Sheets

(56) References Cited

U.S. PATENT DOCUMENTS

| | | | |
|---|---|---|---|
| 6,002,829 A * | 12/1999 | Winston | F21V 5/02 385/129 |
| 6,444,988 B1 * | 9/2002 | Vizard | G21K 4/00 250/367 |
| 6,637,905 B1 | 10/2003 | Ng et al. | |
| 6,890,108 B2 | 5/2005 | Symanowski et al. | |
| 7,255,469 B2 | 8/2007 | Wheatley et al. | |
| 7,462,815 B2 * | 12/2008 | Chua | G01D 5/34715 250/231.13 |
| 8,188,502 B2 | 5/2012 | Li | |
| 2002/0090184 A1 * | 7/2002 | Sayag | G11C 13/04 385/120 |
| 2002/0145593 A1 * | 10/2002 | Boyd | G02B 6/0023 345/173 |
| 2002/0172039 A1 * | 11/2002 | Inditsky | G02B 6/0021 362/231 |
| 2005/0013127 A1 * | 1/2005 | Tsai | G02B 6/002 362/613 |
| 2005/0093430 A1 * | 5/2005 | Ibbetson | H01L 33/505 313/501 |
| 2007/0019408 A1 | 1/2007 | McGuird, Jr. et al. | |
| 2007/0086184 A1 | 4/2007 | Pugh et al. | |
| 2007/0127262 A1 | 6/2007 | Schultz et al. | |
| 2007/0132371 A1 * | 6/2007 | Liu | G02F 1/15 313/504 |
| 2009/0034292 A1 | 2/2009 | Pokrovskiy et al. | |
| 2009/0086475 A1 * | 4/2009 | Caruso | F21V 9/10 362/231 |
| 2009/0091915 A1 | 4/2009 | Eriksson | |
| 2009/0103293 A1 | 4/2009 | Harbers et al. | |
| 2010/0033948 A1 | 2/2010 | Harbers et al. | |
| 2010/0315833 A1 * | 12/2010 | Holman | G02B 6/0028 362/607 |
| 2011/0013389 A1 | 1/2011 | Willemsen et al. | |
| 2012/0236591 A1 * | 9/2012 | Parker | F21K 9/58 362/608 |

\* cited by examiner

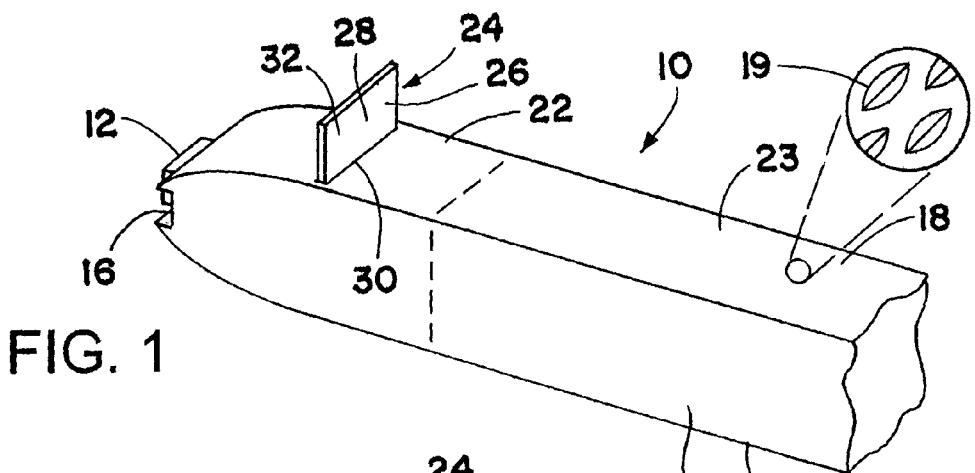
FIG. 1
FIG. 2
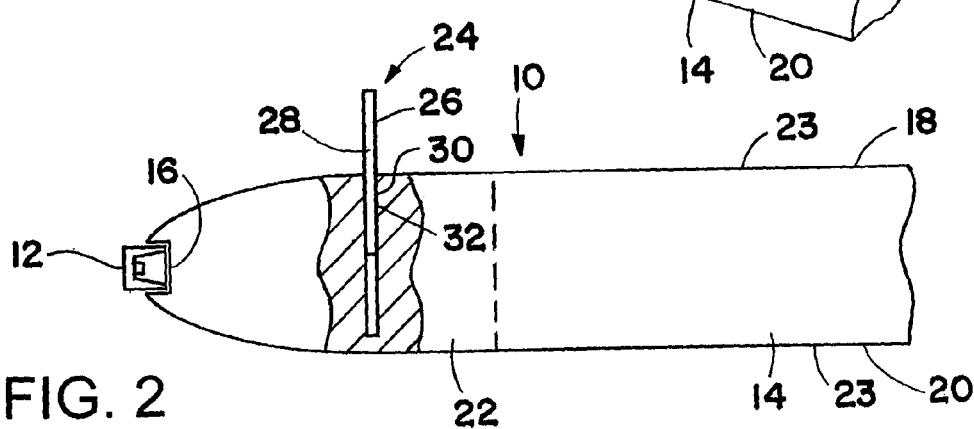
FIG. 3
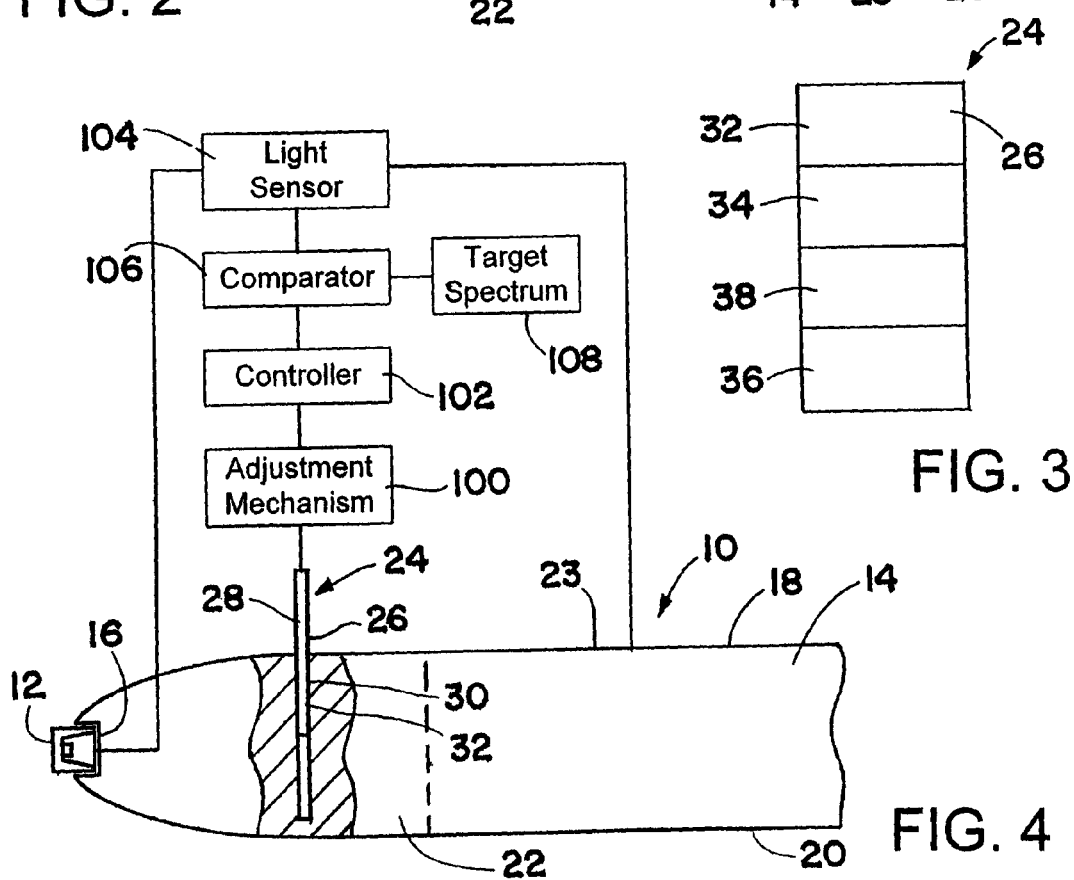
FIG. 4

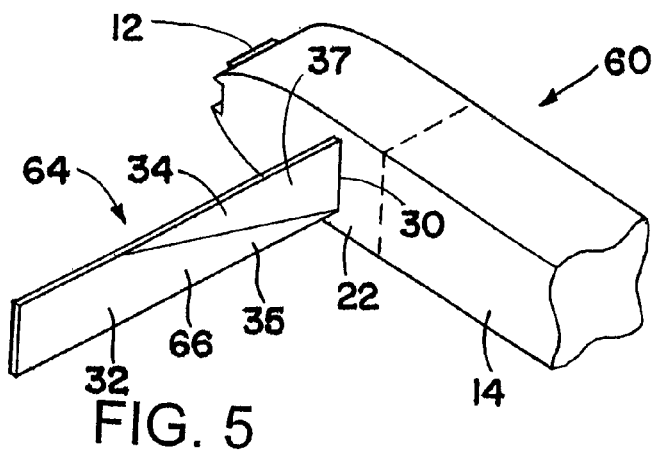
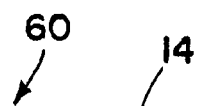
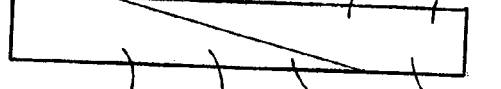
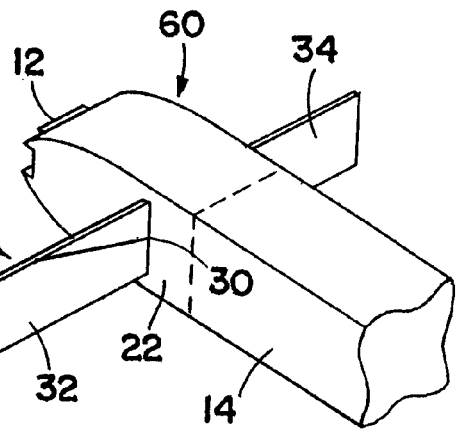
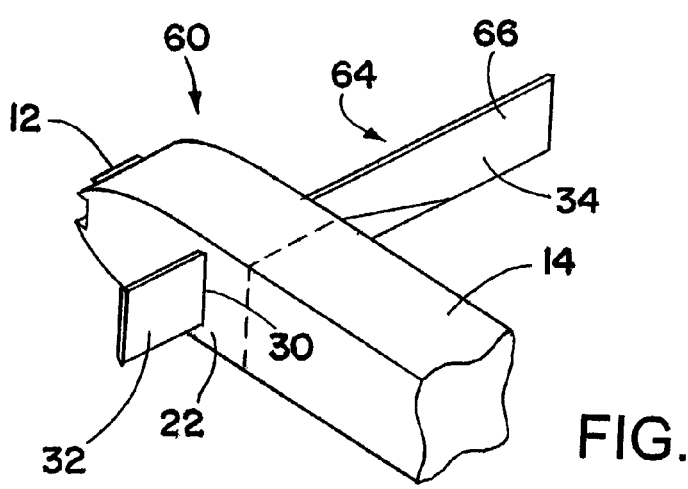

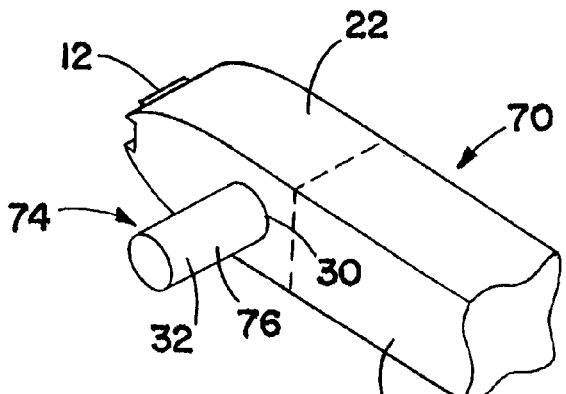
FIG. 16
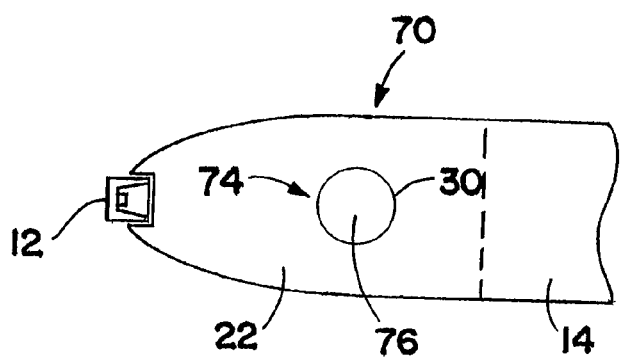
FIG. 17
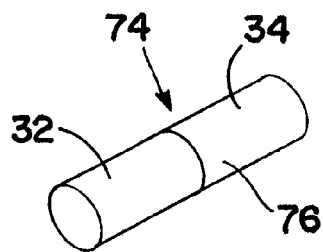
FIG. 18
FIG. 19
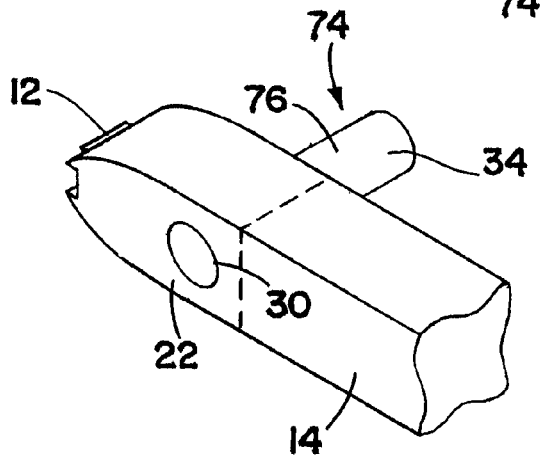
FIG. 20

EDGE LIT LIGHTING ASSEMBLY WITH SPECTRUM ADJUSTER

CROSS-REFERENCE TO RELATED APPLICATIONS

This application claims the benefit of U.S. Provisional Application Ser. No. 61/655,675, filed Jun. 5, 2012, the entire disclosure of which is incorporated herein by reference.

BACKGROUND

There are times when it would be desirable to adjust the spectrum of light within the light guide of an edge lit lighting assembly to achieve a desired light output spectrum. It is known to place a spectrum adjuster between the light source and the light guide of an edge lit lighting assembly to modify the spectrum of the light entering the light guide. However, this may reduce the coupling efficiency of the light source to the light guide, causing a reduction in overall efficiency.

BRIEF DESCRIPTION OF THE DRAWINGS

FIG. 1 is a schematic fragmentary perspective view of an exemplary lighting assembly with spectrum adjuster.

FIG. 2 is a fragmentary side view of the lighting assembly of FIG. 1 with portions of the transition region of the light guide broken away to show the spectrum adjuster extending into an opening in the transition region.

FIG. 3 is an enlarged side view of the spectrum adjuster of the lighting assembly of FIGS. 1 and 2.

FIG. 4 is an enlarged fragmentary side view of another exemplary lighting assembly with spectrum adjuster.

FIG. 5 is a schematic fragmentary perspective view of another exemplary lighting assembly with spectrum adjuster.

FIG. 6 is a fragmentary side view of the lighting assembly of FIG. 5.

FIG. 7 is a schematic side view of the spectrum adjuster of the lighting assembly of FIGS. 5 and 6.

FIGS. 8-10 are schematic fragmentary perspective views of the lighting assembly of FIG. 5 showing the spectrum adjuster in different exemplary adjusted positions.

FIG. 16 is a schematic fragmentary perspective view of another exemplary lighting assembly with spectrum adjuster.

FIG. 17 is a schematic fragmentary side view of the lighting assembly of FIG. 16.

FIG. 18 is a schematic perspective view of the spectrum adjuster of the lighting assembly of FIGS. 16 and 17.

FIGS. 19 and 20 are schematic fragmentary perspective views of the lighting assembly of FIG. 16 showing the spectrum adjuster in different exemplary adjusted positions.

DETAILED DESCRIPTION

Figure 10:
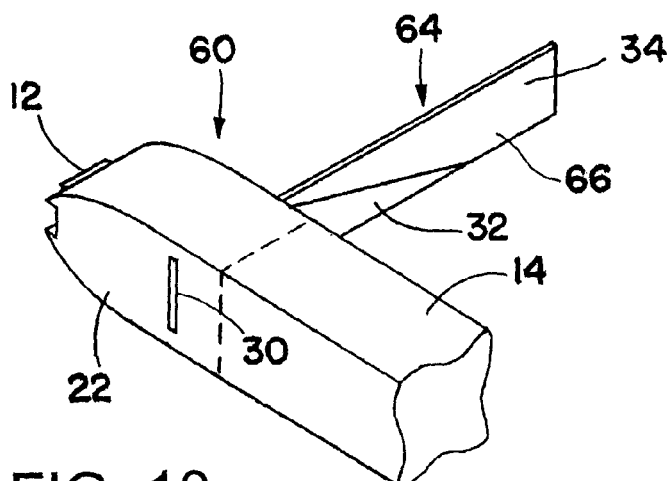

The exemplary embodiments will now be described with reference to the drawings, wherein like reference numerals are used to refer to like elements throughout. The figures are not necessarily to scale. Features that are described and/or illustrated with respect to one exemplary embodiment may be used in the same way or in a similar way in one or more other exemplary embodiments and/or in combinations with or instead of the features of the other exemplary embodiments.

As described in greater detail below, the lighting assembly comprises an edge lit light guide having a light input edge, opposed major surfaces, and a light output region. Light from a light source enters the light guide through the light input edge and propagates within the light guide by total internal reflection. Light extracting elements in the light output region extract light from the light guide through at least one of the major surfaces. A spectrum adjuster is adjustable or selected to modify the spectrum of a portion of the light propagating within the light guide prior to extraction of the light from the light guide to achieve a desired spectrum of the light within the light guide.

In some examples, the spectrum adjuster attenuates the color of a portion of the light within the light guide. In other examples, the spectrum adjuster shifts at least one wavelength of a portion of the light within the light guide.

In an example, the spectrum adjuster is used to attenuate the color and/or shift at least one wavelength of a portion of the light within the light guide to achieve a different color temperature than the color temperature of the light emitted by the light source. In examples, the spectrum adjuster is used to reduce the need for tightly color controlled light sources to achieve a desired color temperature of the light output from the light guide, and/or to correct for color shifts of the light emitted by the light source due to aging.

FIGS. 1, 2 and 4 show an example of a lighting assembly 10 comprising a light source 12 and a light guide 14. The light guide 14 has a light input edge 16 to which the light source 12 is optically coupled to edge light the light guide. The light propagates within the light guide by total internal reflection. For purposes of this disclosure, any surface of the light guide through which light from the light source enters the light guide is considered a light input edge, even if it is located on one of the opposed major surfaces of the light guide.

An arrangement of light extracting elements 19 is provided within a light output region 23 of the light guide in, on or beneath one or both major surfaces 18 and 20 of the light guide 14 for extracting light from the light guide through one of the major surfaces of the light guide. The light extracted from the light guide through the light output surface will be referred to hereinafter as extracted light.

In an example, the light extracting elements are in, on or beneath both major surfaces 18 and 20 of the light guide within the light output region 23. In another example, light extracting elements are in, on or beneath one of the major surfaces of the light guide within the light output region 23. Light extracting elements that are in, on or beneath a major surface will be referred to hereinafter as being "at" the major surface.

In some embodiments, the light extracting elements in, on or beneath one major surface 18, 20 of the light guide 14 function to disrupt the total internal reflection of the propagating light that is incident thereon to reflect light toward the other major surface 20, 18 so that the light exits the light guide through the other major surface 20, 18. In other embodiments, the light extracting elements in, on or beneath one major surface 18, 20 of the light guide 14 transmit light incident thereon through the light extracting elements and out the major surface 18, 20. In yet another embodiment, both of these types of light extracting elements are present. In yet another embodiment, the light extracting elements reflect some of the light incident thereon and refract the remainder of the light incident thereon. A reflective element (not shown) may be provided at or adjacent a major surface of the light guide opposite the light output surface for reflecting light towards the light output surface of the light guide.

Exemplary light extracting elements include prismatic elements, lenticular elements, and features of well defined shape that are small relative to the linear dimensions of the major surfaces of the light guide, which are sometimes referred to as micro-optical elements. The smaller of the length and width of a micro-optical element is less than one-tenth of the longer of the length and width of the light guide, and the larger of the length and width of the micro-optical element is less than one-half of the smaller of the length and width of the light guide. The length and width of a micro-optical element are measured in a plane parallel to the major surface of the light guide for flat light guides and along the surface contour for non-flat light guides.

Micro-optical elements are shaped to predictably reflect light or predictably refract light. Exemplary micro-optical elements are described in U.S. Pat. No. 6,752,505 and, for the sake of brevity, will not be described in detail in this disclosure. The micro-optical elements may vary in one or more of size, shape, depth or height, density, orientation, slope angle, and index of refraction to provide a desired light output from the light guide.

Light guides 14 having light extracting elements 19 are typically formed by a process such as molding. The light extracting elements are typically defined in a shim or insert used for molding light guides by a process such as diamond machining, laser etching, laser micromachining, chemical etching, or photolithography. Alternatively, any of the above-mentioned processes may be used to define the light extracting elements in a master that is used to make the shim or insert. Light guides without light extracting elements are typically formed by a process such as molding or extruding, and the light extracting elements 19 are subsequently formed on one or both of the major surfaces 18, 20 by a process such as stamping, embossing, or laser etching, or another suitable process. Light extracting elements may also be produced by depositing elements of curable material on the major surface 18, 20 of the light guide 14 and curing the deposited material using heat, UV-light, or other radiation. The curable material can be deposited by a process such as printing, ink jet printing, screen printing, or another suitable process. Alternatively, the light extracting elements 19 may be inside the light guide between the major surfaces 18, 20 (e.g., the light extracting elements 19 may be light redirecting particles and/or voids disposed in the light guide).

The light guide 14 may be comprised of a single optical material (for example, acrylic, polycarbonate, glass or other appropriate material) which may be rigid or flexible or be comprised of multiple layers of materials of different indices of refraction and may optionally contain light extracting elements at the surface of one or more of the layers adjacent another of the layers. Also the light guide may contain particles with different indices of refraction than that of the light guide and/or contain voids for scattering light.

The light source 12 may be of any suitable type. Examples of light sources include one or more solid-state light emitters, arc lamps, incandescent bulbs, lens end bulbs, line lights, halogen lamps, neon bulbs, cold cathode fluorescent lamps, fiber optic light pipes transmitting from a remote source, or other suitable light sources. Examples of solid-state light emitters include light-emitting diodes (LEDs), laser diodes, and organic LEDs. The solid-state light emitters may have a top-fire or side-fire configuration. The solid-state light emitters may be broad spectrum solid-state light emitters (e.g., emit white light), solid-state light emitters that emit light of a desired color or spectrum (e.g., red light, green light, blue light, or ultraviolet light), or a mixture of broad-spectrum solid-state light emitters and solid-state light emitters that emit light of a desired color or spectrum.

Between the light input edge 16 and the light output surface 18 and/or 20 of the light guide 14 is the transition region 22 into which the light from the light source 12 enters through the light input edge 16 and mixes in the transition region before the light reaches the light output region 23 of the light guide.

At the transition region 22 of the light guide 14 is a spectrum adjuster 24 comprising a spectrum-adjusting element 26 attached to, coated on or embedded in (hereinafter referred to as coupled to) a substrate 28 of optically-transparent or optically-transmissive material (hereinafter referred to as transparent). The substrate 28 has a cross-sectional shape substantially corresponding to the cross-sectional shape of a slot, cavity or hole 30 (hereinafter referred to as an opening) in the transition region 22.

In the example shown in FIGS. 1, 2 and 4, the spectrum adjuster 24 has a rectangular shape, with a length and width less than the thickness and width of the transition region 22 for close sliding receipt in the opening 30 which extends partway through the width or thickness of the transition region 22 from a side thereof.

In other examples, the spectrum adjuster has a rectangular shape with a width less than the thickness or width of the transition region 22 and a length greater than the width or thickness of the transition region for close sliding receipt in a corresponding cross-sectional shaped opening extending all the way through the width or thickness of the transition region.

In other examples, the spectrum adjuster has a curved shape for close sliding receipt in a correspondingly curved shaped opening extending completely through the width or thickness of the transition region 22, and comprises a complete ring or a portion of a ring.

In other examples, the spectrum adjuster has a cylindrical shape with an outer diameter less than the width or thickness of the transition region for receipt in a corresponding cross-sectional shaped cylindrical opening extending through a side of the transition region. In one example, the cylindrical spectrum adjuster has a length greater than the length of the opening in the transition region in which the spectrum adjuster is received for close sliding receipt of the spectrum adjuster within the opening. In another example, the cylindrical spectrum adjuster has a length substantially corresponding to the length of the opening in the transition region in which the spectrum adjuster is received and is mounted for rotation within the opening.

In other examples, the spectrum adjuster is at an exterior surface of the transition region of the light guide.

The spectrum-adjusting element comprises one or more spectrum-adjusting regions that are selectively movable into and out of a portion of the light path within the transition region to modify the spectrum of the portion of the light within the light guide that is incident on the one or more spectrum-adjusting regions. In an example, the spectrum-adjusting element comprises a spectrum-adjusting region that has a spatially-uniform spectrum-adjusting property. In another example, the spectrum-adjusting element comprises a spectrum-adjusting region that has a spatially-varying spectrum-adjusting property. The positioning of the spectrum adjuster relative to the light path within the transition region and spectrum-adjusting characteristics of the spectrum-adjusting material determine the extent to which the spectrum of the portion of the light within the light guide that is incident on the spectrum adjuster is modified by the spectrum adjuster.

In some examples, the spectrum-adjusting material comprises a color-attenuating material and/or a wavelength-shifting material. A wavelength-shifting material is a material that absorbs light of one or more certain wavelengths, and re-emits the light at one or more different wavelengths. Examples of a wavelength-shifting material include a phosphor material, a luminescent material, a luminescent nanomaterial such as a quantum dot material, a conjugated polymer material, an organic fluorescent dye, and an organic phosphorescent dye.

A color-attenuating material absorbs or reflects light of one or more wavelengths. Examples of a color-attenuating material include organic or inorganic color-attenuating materials that can be added to glass or polymer materials in varying amounts to provide desired color-attenuating properties, both in terms of the color(s) attenuated, and the amount of attenuation. The color attenuation may be varied by varying the concentration of the color-attenuating material at different positions within a color-attenuating region. Alternatively, the color attenuation may be varied by varying the thickness of the color-attenuating material at different positions within a color-attenuating region. For example, the color-attenuating region may include a variable-thickness layer that includes the color-attenuating material.

The change in color-attenuating property may be combined with additional features to keep the overall intensity of the light output the same for different relative positioning of the spectrum adjuster relative to a portion of the light path. In one example, a portion of the spectrum adjuster comprises a neutral-density filter. The neutral-density filter has a variation of attenuation with position that compensates for any positional variations in intensity of light passing through the color-attenuating material.

In other examples, the spectrum-adjusting element comprises a color filter, a grating, a dielectric film, a dichroic mirror, or a polychroic mirror.

In another example, the spectrum-adjusting element is one of a plurality of spectrum-adjusting elements that collectively achieve the desired spectrum of the light within the light guide.

In the example shown in FIGS. 1, 2 and 4, the spectrum adjuster 24 is variably positionable within the opening 30 in the transition region 22 to vary the spectrum of the portion of the light emitted by the light source 12 incident on the spectrum-adjusting element 26. The remainder of the light emitted by the light source 12 bypasses the spectrum-adjusting element 26 and mixes with the light from the spectrum-adjusting element to achieve the desired spectrum of the light within the light guide.

In one example, the spectrum-adjusting element 26 comprises a single spectrum-adjusting region 32 of spectrum-adjusting material having a spatially-uniform spectrum-adjusting property. In another example, the spectrum-adjusting property of the spectrum-adjusting material increases or decreases monotonically from one end of the spectrum-adjusting region 32 to the other. The increase or decrease may be linear or nonlinear.

In another example shown in FIG. 3, the spectrum-adjusting element 26 of the spectrum adjuster 24 comprises two or more spectrum-adjusting regions 32, 34 and 36 of spectrum-adjusting material having different spectrum-adjusting properties, and is variably positionable within the opening 30 in the transition region 22 to vary the spectrum-adjusting regions on which the portion of light within the transition region is incident to vary the spectrum of the light within the light guide.

In another example also shown in FIG. 3, the spectrum-adjusting element 26 comprises one or more non-spectrum-adjusting regions 38 containing no operably-effective amount of spectrum-adjusting material that is between two or more of the spectrum-adjusting regions 32, 34 and 36 and is variably positionable within the opening 30 in the transition region to vary the spectrum-adjusting and non-spectrum adjusting regions on which the portion of light within the transition region is incident to vary the spectrum of the light within the light guide.

Figure 11:
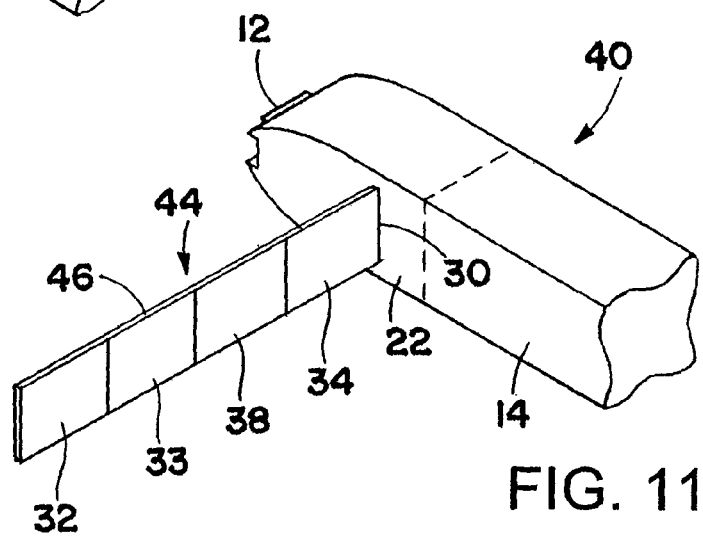
FIG. 11 is a schematic fragmentary perspective view of another exemplary lighting assembly with spectrum adjuster.
Figure 12:
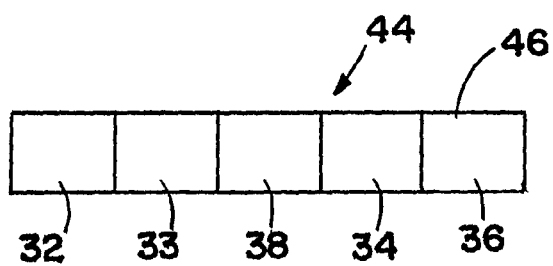
FIG. 12 is a schematic side view of the spectrum adjuster of the lighting assembly of FIG. 11.
Figure 13:
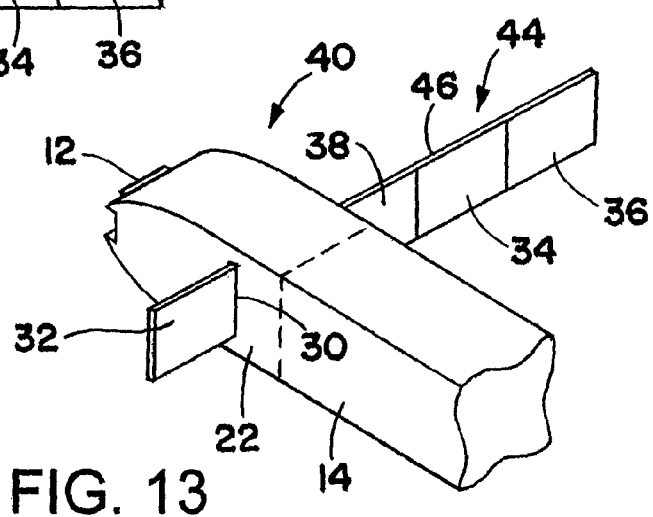
FIG. 13 is a schematic fragmentary perspective view of the lighting assembly of FIG. 11 showing the spectrum adjuster in a different exemplary adjusted position.

In other examples of lighting assemblies 40 and 50 shown in FIGS. 11-13 and FIGS. 14 and 15, respectively, the length of the spectrum adjusters 44 and 54 is greater than the width or thickness of the transition regions 22 of the respective light guides 14, and the corresponding cross-sectional shaped openings 30 in the transition regions that closely slidably receive the spectrum adjusters extend all of the way through the width or thickness of the respective transition regions. This enables the spectrum-adjusting elements 46 and 56 of the respective spectrum adjusters 44 and 54 to comprise additional spectrum-adjusting regions of spectrum-adjusting material having different spectrum-adjusting properties that are selectively movable into and out of a portion of the light path within the transition region to vary the spectrum-adjusting regions on which the portion of light within the transition region is incident to vary the spectrum of the light within the light guide. FIGS. 11 and 13 show the spectrum adjuster 44 in two different exemplary adjusted positions.

The exemplary spectrum-adjusting element 46 shown in FIGS. 11-13 comprises four spectrum-adjusting regions 32, 33, 34 and 36 and one non-spectrum-adjusting region 38. The exemplary spectrum-adjusting element 56 shown in FIGS. 14 and 15 comprises more than four spectrum-adjusting regions.

The spectrum-adjusting regions may be of the same or different lengths, and the lengths may be equal to, less than, or more than the length of the openings 30 in the transition regions 22 that receive the respective spectrum adjusters 44 and 54. Additionally, the spectrum-adjusting elements 46 and 56 of the spectrum adjusters 44 and 54 may comprise one or more non-spectrum-adjusting regions 38 containing no operably-effective amount of spectrum-adjusting material between two or more spectrum-adjusting regions. In the examples shown in FIGS. 11-13 and FIGS. 14 and 15, respectively, a non-spectrum-adjusting region 38 is between the spectrum-adjusting regions 33 and 34. In these examples, the spectrum-adjusters 44 and 54 are variably positionable within the opening 30 in the respective transition regions 22 to place a portion of the spectrum-adjusting region 33, a portion of the spectrum-adjusting region 34, a portion of the non-spectrum-adjusting region 38, or some combination of a portion of the non-spectrum-adjusting region 38 and a portion of either of the spectrum-adjusting regions 33 and 34 within the opening 30 to vary the spectrum-adjusting and non-spectrum-adjusting regions on which the portion of light within the transition region is incident to vary the spectrum of the light within the light guide.

Figure 14:
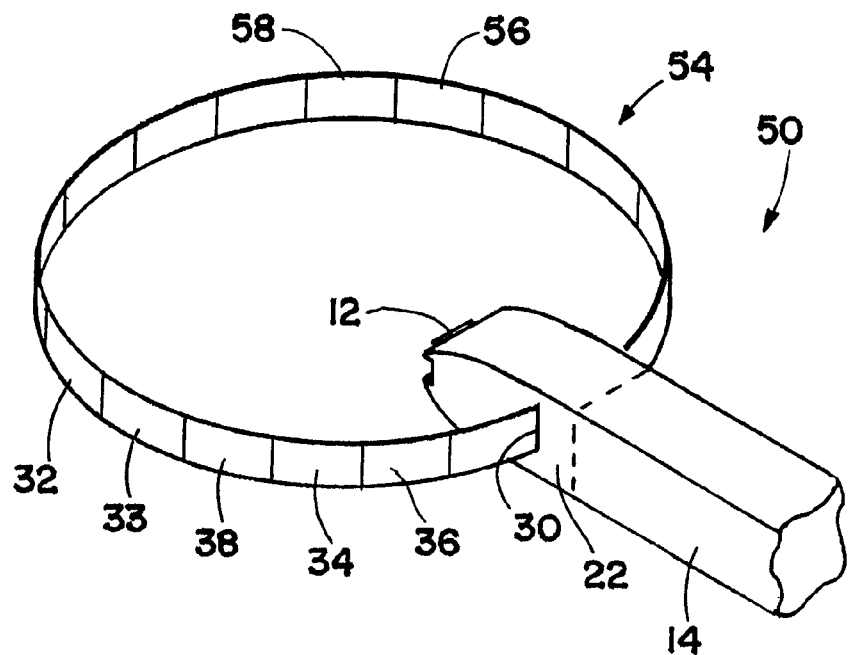
FIG. 14 is a schematic fragmentary perspective view of another exemplary lighting assembly with spectrum adjuster.
Figure 15:
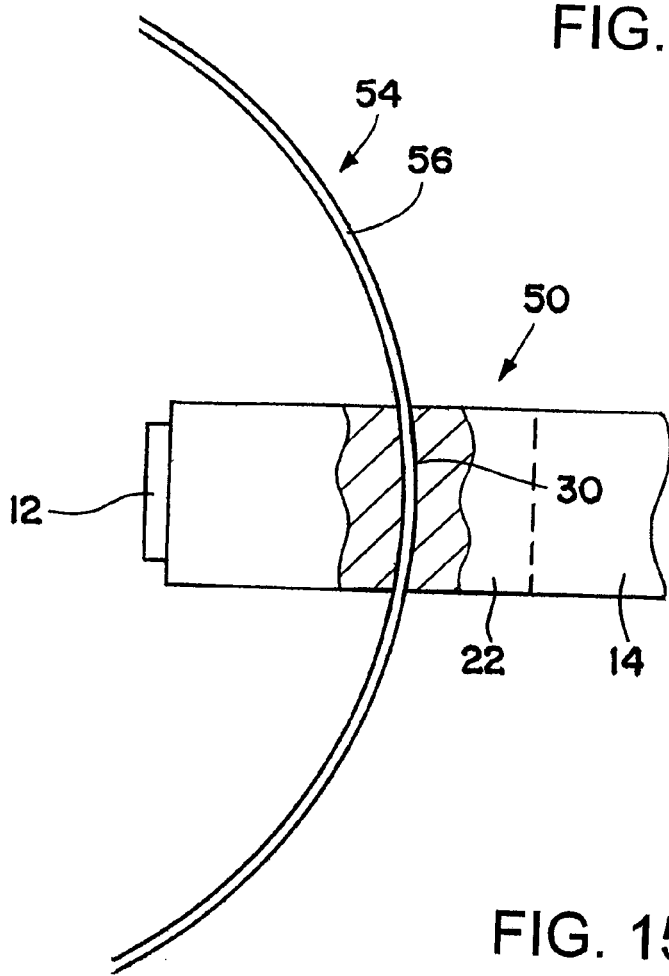
FIG. 15 is an enlarged schematic fragmentary top view of the lighting assembly of FIG. 14 with portions of the transition region of the light guide broken away to show the spectrum adjuster extending through an opening in the transition region.

In the example shown in FIGS. 14 and 15, the spectrum adjuster 54 has a curved shape for close sliding receipt in a corresponding curved shaped opening 30 extending all the way through the width or thickness of the transition region 22, and may be a complete ring 58 as shown in FIG. 14, or a portion of a ring as shown in FIG. 15.

In another example of a lighting assembly 60 shown in FIGS. 5-10, the spectrum adjuster 64 has a length greater than the width or thickness of the transition region 22 of the light guide 14 for close sliding receipt in a corresponding cross-sectional shaped opening 30 extending all the way through the width or thickness of the transition region 22. In this example, the spectrum-adjusting element 66 of the spectrum adjuster 64 has at least two spectrum-adjusting regions 32 and 34 of spectrum-adjusting material having different spectrum-adjusting properties (or alternatively one spectrum-adjusting region 32 and one non-spectrum-adjusting region (38) shown in FIG. 7) that taper in width over at least a portion of their length to overlap one another along their respective tapered portions 35 and 37 to vary the extent to which the spectrum of the portion of the light emitted by the light source incident thereon is modified based on positioning of the spectrum adjuster within the opening in the transition area to achieve a desired spectrum of the light within the light guide. FIGS. 5 and 8-10 show the spectrum adjuster 64 in four different exemplary adjusted positions within the opening 30.

In another example of a lighting assembly 70 shown in FIGS. 16-20, the spectrum adjuster 74 has a cylindrical shape with an outer diameter less than the width or thickness of the transition region 22 of the light guide 14 and a length greater than the width or thickness of the transition region for close sliding receipt in a corresponding cross-sectional shaped cylindrical opening 30 extending all the way through the width or thickness of the transition region. In this example, the spectrum-adjusting element 76 of the spectrum adjuster 74 has at least two spectrum-adjusting regions 32 and 34 of spectrum-adjusting material having different spectrum-adjusting properties, and is variably positionable within the opening 30 in the transition region 22 to vary the portion of the light within the transition region that is incident on these different spectrum-adjusting regions to vary the spectrum of the light within the light guide. In this example, the position of the spectrum adjuster 74 is varied by sliding the spectrum adjuster within the opening 30. FIGS. 16, 19 and 20 show the spectrum adjuster 74 in three different exemplary adjusted positions within the opening 30.

Figure 21:
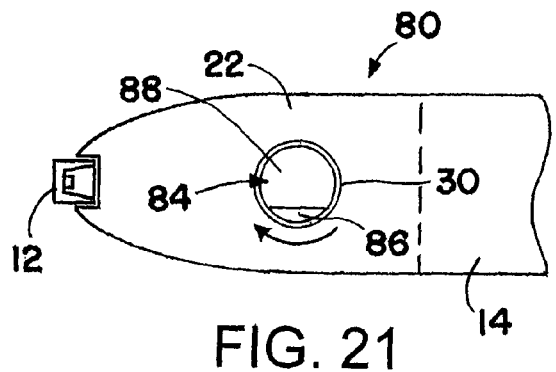
FIG. 21 is a schematic fragmentary side view of another exemplary lighting assembly with spectrum adjuster.
Figure 22:
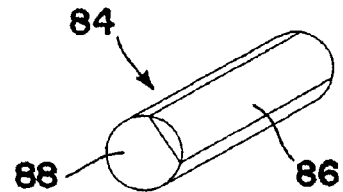
FIG. 22 is a schematic perspective view of the spectrum adjuster of the lighting assembly of FIG. 21.
Figure 23:
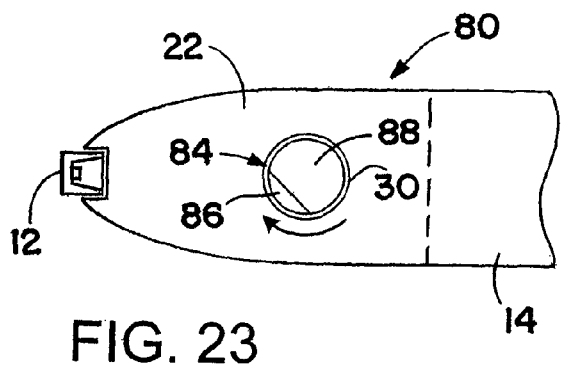
FIGS. 23 and 24 are schematic fragmentary side views of the lighting assembly of FIG. 21 showing the spectrum adjuster in different exemplary adjusted positions.
Figure 24:
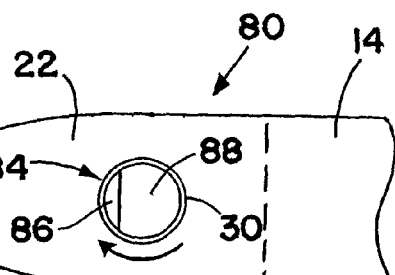
Figure 25:
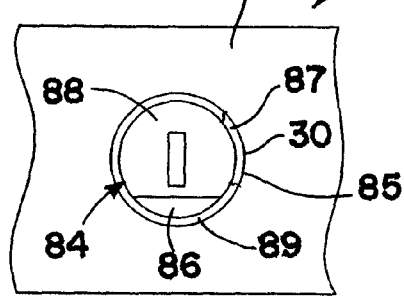
FIG. 25 is a schematic fragmentary side view of another exemplary lighting assembly with spectrum adjuster.
Figure 26:
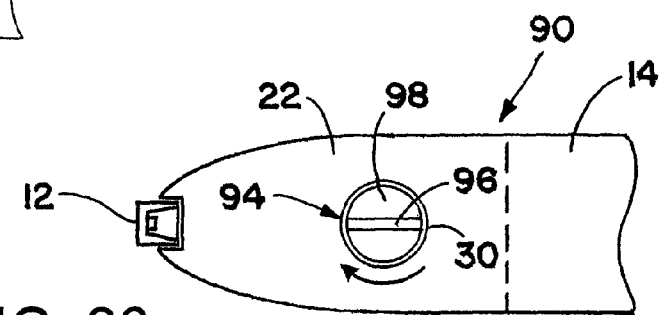
FIG. 26 is a schematic fragmentary side view of another exemplary lighting assembly with spectrum adjuster.
Figure 27:
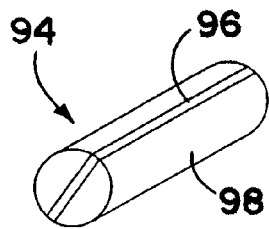
FIG. 27 is a schematic perspective view of the spectrum adjuster of the lighting assembly of FIG. 26.
Figure 28:
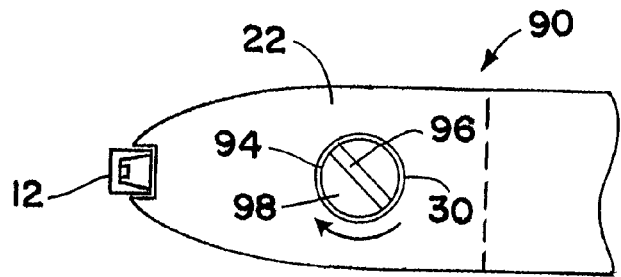
FIGS. 28 and 29 are schematic fragmentary side views of the lighting assembly of FIG. 26 showing the spectrum adjuster in different exemplary adjusted positions.
Figure 29:
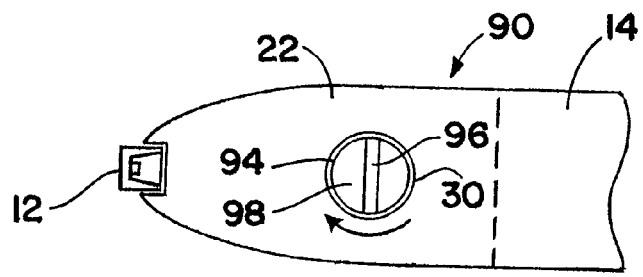

In other examples of lighting assemblies 80 and 90 shown in FIGS. 21-25 and in FIGS. 26-29, respectively, the respective spectrum adjusters 84 and 94 have a cylindrical shape with an outer diameter less than the width or thickness of the transition region 22 of the light guide 14 for receipt in a corresponding cross-sectional shaped cylindrical opening 30 extending through a side of the transition region. In the example shown in FIGS. 21-25, the spectrum-adjusting element 86 is attached to and forms part of the cylindrical transparent substrate 88. In the example shown in FIGS. 26-29, the spectrum-adjusting element 96 is embedded in the transparent substrate 98. In both of these examples, the respective spectrum adjusters 84 and 94 are rotatably mounted within the opening 30 in the transition region 22 of the light guide 14 to vary the orientation of the respective spectrum-adjusting elements 86 and 96 relative to the direction of the light path within the transition region to vary the effect of the spectrum adjuster on the spectrum of the portion of the light that is incident on the respective spectrum-adjusting elements within the light guide. FIGS. 21, 23 and 24 show the spectrum adjuster 84 in three different exemplary rotatable adjusted positions. FIGS. 26, 28 and 29 show the spectrum adjuster 94 in three different exemplary rotatable adjusted positions within the opening 30.

Providing an opening in the transition region of the light guide for the spectrum adjuster introduces an air gap between the spectrum adjuster and the light guide that will cause some reduction in efficiency of the light output from the light guide. However, in embodiments in which there is direct or indirect (e.g., via an index-matching fluid) optical contact between the spectrum adjuster and the light guide, the loss of efficiency will be negligible.

In the examples shown in FIGS. 21-24 and FIGS. 26-29 wherein the spectrum adjusters are rotatably mounted within the opening 30 in the transition region 22 of the light guide 14, any slight air gap 85 that exists therebetween may be eliminated by filling the gap with a fluid 87 having an index of refraction closely matching the indices of refraction of the transparent substrate and the light guide and containing the index matching fluid within the gap by a seal 89 as schematically shown in FIG. 25. Efficiency losses may be further reduced by the refractive index of the spectrum adjuster except for the spectrum-adjusting material closely matching (e.g., differing by a difference less than 0.1) the refractive index of the light guide.

If spectrum adjustment is no longer needed or desired, the spectrum adjuster may be removed and the opening in the transition region plugged with a transparent plug substrate (not shown) having an index of refraction closely matching the index of refraction of the light guide.

The spectrum adjuster is variably positionable within the opening in the transition region through the use of an adjustment mechanism. The adjustment mechanism may include any of a variety of electrical, mechanical or other elements for effecting a positional change of the spectrum adjuster within the opening in the transition region. Examples of such elements are motors, actuators, gears and belts. In one example, after adjustment, the relative positioning of the spectrum adjuster is fixed. Other manually-operated mechanisms are possible. For example, types of sliders may be employed or a turnable knob may act on a movable component through a gear or drive change. In other embodiments, the adjuster mechanism is motorized to move the spectrum adjuster relative to the opening in the transition region. The motorized mechanism may be controlled by a control assembly to adjust the spectrum of the light within the light guide based on user input, feedback from sensors, or a triggering event. In another example, the adjustment mechanism is controllable either manually or automatically by a machine, such as a computer or using a computer as an intermediate agent. The term "computer" should be understood broadly as encompassing all sorts of circuits, such as integrated circuits, used for performing general or specific tasks.

FIG. 4 shows an example of an adjustment mechanism 100 whose operation is controlled by a controller 102 to position the spectrum adjuster as needed to obtain a target spectrum of the extracted light from the light output surface 18 and/or 20 of the light guide 14. In this example, the target spectrum is determined by providing a light sensor 104 to measure the spectrum of the light emitted from the light source 12 and/or the light within or extracted from the light output region 23 of the light guide 14, a comparator 106 for comparing the measured spectrum of the light emitted from the light source and/or the light within or extracted from the light output region to a target spectrum 108 of light, and the controller 102 for controlling operation of the adjustment mechanism to position the spectrum adjuster as needed to obtain a desired spectrum of the light within the light guide.

Figure 30:
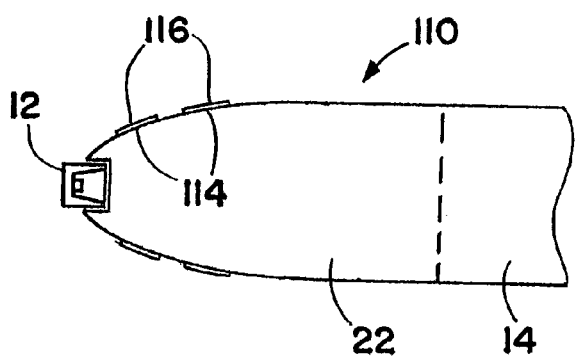
FIG. 30 is a schematic fragmentary side view of another exemplary lighting assembly with spectrum adjuster.
Figure 31:
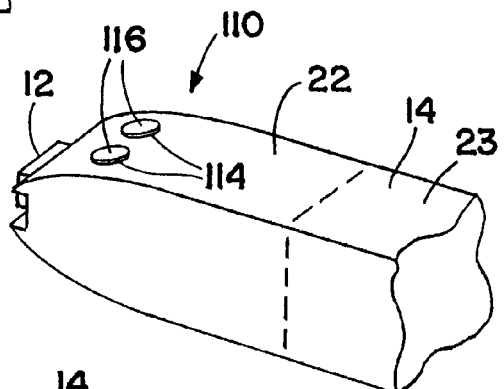
FIG. 31 is a schematic fragmentary perspective view of the lighting assembly of FIG. 30.
Figure 32:
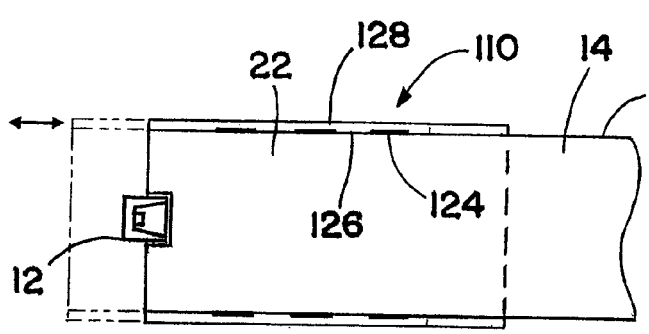
FIG. 32 is a schematic side view, partly in section, of another exemplary lighting assembly with spectrum adjuster.

In other examples of lighting assemblies 110 and 120 shown in FIGS. 30 and 31 and in FIG. 32, the respective spectrum adjusters 114 and 124 comprise a coating of spectrum-adjusting material that is applied to selected areas of an exterior surface of the transition region 22 of the light guide 14. In the example shown in FIGS. 30 and 31, the coating 114 of spectrum-adjusting material is on stickers 116 that are adhesively applied to selected areas of the exterior surface of the transition region 22. The number and placement of the stickers 116 that are adhesively applied to the exterior surface of the transition region are selected to achieve a desired spectrum of the light within the light guide. The stickers 116 can be of different sizes and have coatings 114 of spectrum-adjusting material having the same or different spectrum-adjusting properties for varying the spectrum of the portion of the light emitted by the light source incident on the spectrum-adjusting material to achieve a desired spectrum of the light within the light guide. A light sensor 104 such as shown in FIG. 4 may be used to measure the spectrum of the light within or extracted from the light output region 23 of the light guide. The stickers 116 are located on the exterior surface of the transition area to achieve the desired spectrum of light within the light guide, e.g., a spectrum as indicated by the target spectrum 108 also shown in FIG. 4.

In the example shown in FIG. 32, the coating 124 of spectrum-adjusting material is applied to selected areas of a surface 126 of a reflector 128 that optically contacts the exterior surface of the transition region 22. The coating is made of a material that absorbs specific wavelengths of the light incident on the coating, or that wavelength shifts one or more of the wavelengths of the light incident on the coating, and the reflector 128 reflects the light incident on non-coated portions of the surface of the reflector to achieve a desired spectrum of the light within the light guide.

The reflector 128 is variably positionable with respect to the exterior surface of the transition region 22 to vary the amount and placement of the coating 124 of spectrum-adjusting material contacting the exterior surface of the transition region 22 to achieve the desired spectrum of light within the light guide. The sides of the transition region 22 contacted by the reflector 126 are flat as shown in FIG. 32 to provide sliding optical contact without any air gaps therebetween. A light sensor 104 such as shown in FIG. 4 may be used to measure the spectrum of the light within or extracted from the light output region 23 of the light guide 14. The reflector 128 is located with respect to the exterior surface of the transition region to achieve the desired spectrum of light within the light guide, e.g., a spectrum as indicated by the target spectrum 108. Once positioned, the relative positioning of the reflector 128 with respect to the exterior surface of the transition region 22 will remain unchanged until the user or a control assembly makes a change to the relative positioning.

In another example of a lighting assembly 130 shown in FIGS. 33-37, the spectrum adjuster 132 is located between the light input edge 134 of the light guide 136 and the light source(s) 138 to modify the spectrum of a portion of the light passing through the spectrum adjuster before entering the light guide.

Figure 33:
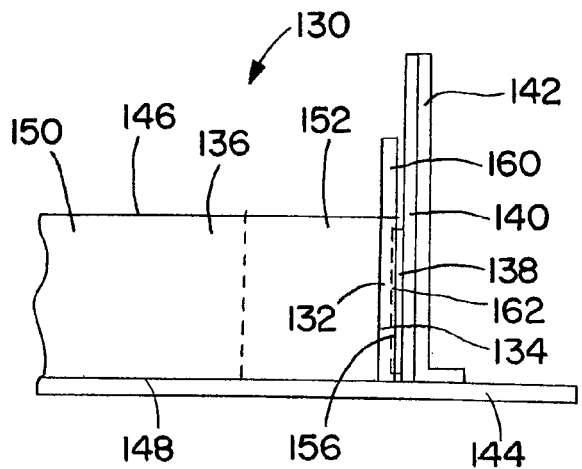
FIG. 33 is a schematic fragmentary side view of another exemplary lighting assembly with a spectrum adjuster.
Figure 34:
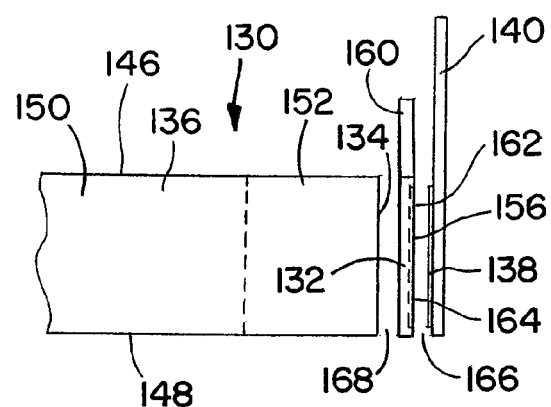
FIG. 34 is an exploded schematic fragmentary side view of the light guide, spectrum adjuster and light sources of the lighting assembly of FIG. 33.
Figure 35:
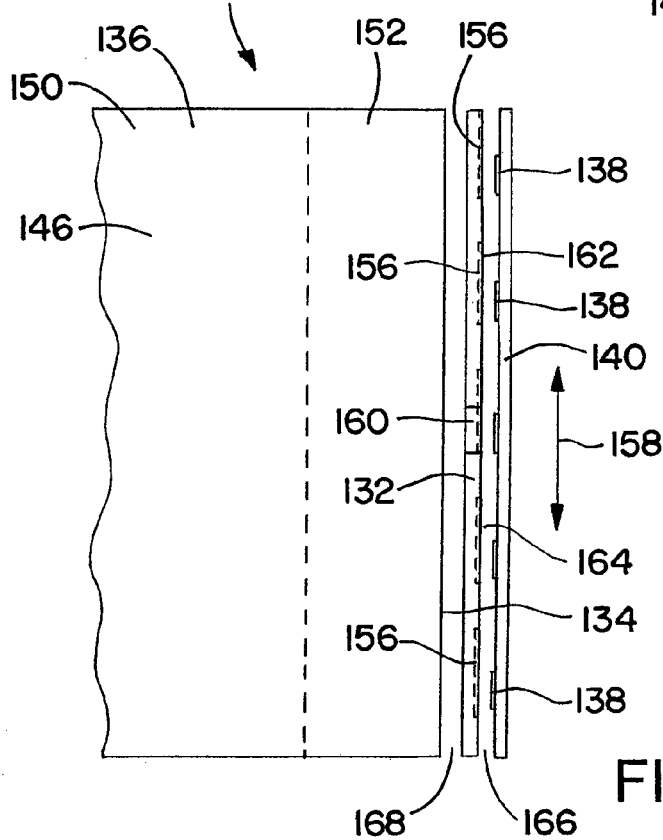
FIG. 35 is an exploded schematic fragmentary top plan view of FIG. 34.

In this example, a plurality of laterally spaced light sources 138 are mounted on a circuit board 140. The circuit board is in turn mounted on an angled bracket 142 attached to a base 144 to which the light guide 136 may also be affixed as schematically shown in FIG. 33.

The light guide 136 comprises opposed major surfaces 146 and 148 between which light input at the light input edge 134 propagates by total internal reflection.

An arrangement of light extracting elements (not shown) is provided within a light output region 150 of the light guide 136 for extracting light from the light guide through one or both of the major surfaces 146 and 148 of the light guide. In this example, the surface of the base 144 facing toward the major surface 148 is reflective so most of the light output is through the major surface 146. Between the light input edge 134 and the light output region 150 of the light guide is a transition region 152 into which the light from the light sources 138 enters through the light input edge 134 and mixes in the transition region 152 before the light reaches the light output region 150 of the light guide.

The light sources 138 may be of any suitable type including but not limited to solid state light emitters such as light emitting diodes.

The spectrum adjuster 132 is positioned in an opening between the light sources 138 and the light input edge 134 of the light guide 136, and comprises respective spectrum-adjusting regions 156 associated with each light source 138 to modify the spectrum of a portion of the light from each of the light sources incident on the spectrum-adjusting regions prior to entering the light input edge.

Figure 36:
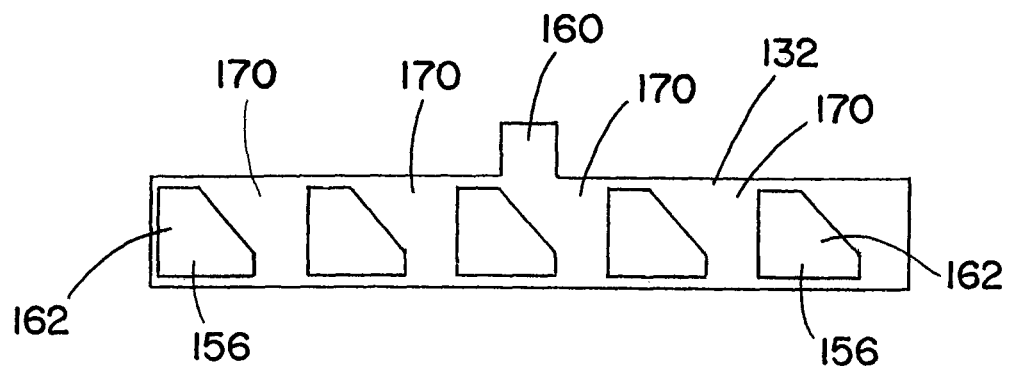
FIG. 36 is an enlarged schematic front elevation view of the spectrum adjuster of FIG. 35.
Figure 37:
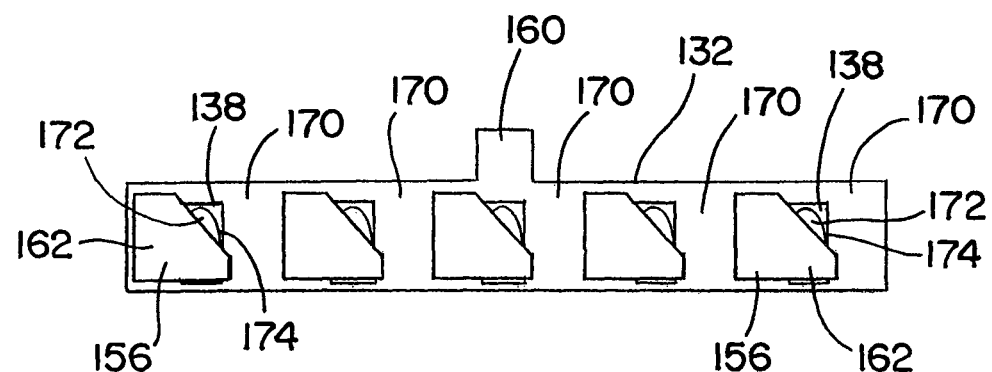
FIG. 37 is an enlarged schematic front elevation view of the spectrum adjuster similar to FIG. 36 but showing the light sources located behind the spectrum adjuster.

In this example, each of the spectrum-adjusting regions 156 tapers in width over at least a portion of its length as shown in FIGS. 36 and 37, and the spectrum adjuster 132 is variably positionable relative to the light guide 136 and the light sources 138 along the direction 158 which is parallel to the width direction of the light input edge of the light guide (see FIG. 35) and also parallel to the length direction of the spectrum adjuster to vary the extent to which the spectrum of the portion of the light emitted by the light sources incident thereon is modified based on the lateral positioning of the spectrum adjuster within the opening between the light sources 138 and the light input edge 134 of the light guide 136 to achieve a desired spectrum of the light entering the light guide. A handle 160 is provided on the spectrum adjuster 132 for ease of grasping by the user to vary the position of the spectrum adjuster to achieve the desired spectrum of the light entering the light guide.

In this example, the spectrum-adjusting material 162 of the spectrum-adjusting regions 156 is on the light input edge 164 of the spectrum adjuster 132 in order to place the spectrum-adjusting material as close as possible to the respective light sources 138. Although the spacing between the spectrum adjuster 132 and both the light sources 138 and the light guide 136 is exaggerated in FIGS. 34 and 35, there are slight air gaps 166 and 168 therebetween that may be eliminated by filling the gaps with a fluid (not shown) to reduce Fresnel reflection losses such as by using an index-matching material.

As best seen in FIGS. 36 and 37, the spectrum-adjusting regions 156 may be configured to be substantially identical to each other and the spectrum-adjusting material 162 of the respective spectrum-adjusting regions may have the same spectrum-adjusting properties so their effect on the spectrum of the light incident thereon from the respective light sources is substantially identical so long as the light output from the light sources is substantially identical.

Adjacent the spectrum-adjusting regions 156 of the spectrum adjuster 132 are non-spectrum adjusting regions 170 containing little or no operably effective amount of spectrum-adjusting material to vary the extent to which the spectrum of the portion of the light emitted by the light sources incident thereon is modified based on positioning of the spectrum adjuster between the light sources and the light input edge of the light guide. FIG. 37 shows the spectrum-adjusting regions 156 partially overlapping the respective light sources 138, in a position where some of the incident light from the light sources is affected by the spectrum-adjusting regions and some of the incident light is not affected by the spectrum-adjusting regions. In this example, each light source 138 may be configured as a solid-state light emitter in which the light output of a blue LED is partially down-converted by a phosphor material 172 in an elliptical phosphor region 174, whereby the light output from the respective light sources is output through the elliptical phosphor regions. In this example, an elliptical phosphor region is used, but a circular phosphor region can also be used.

The lighting assemblies in this disclosure are particularly useful where the user needs to adjust its spectrum. In a household, the lighting assembly can be used as an under-cabinet lighting assembly, such as a lighting assembly used under kitchen cabinets.

In this disclosure, the phrase "one of" followed by a list is intended to mean the elements of the list in the alternative. For example, "one of A, B and C" means A or B or C. The phrase "at least one of" followed by a list is intended to mean one or more of the elements of the list in the alternative. For example, "at least one of A, B and C" means A or B or C or (A and B) or (A and C) or (B and C) or (A and B and C).

Although this disclosure has described certain embodiments, equivalent alterations and modifications will become apparent upon the reading and understanding of the specification. In particular, with regard to the various functions performed by the above-described components, the terms used to describe such components are intended to correspond, unless otherwise indicated, to any component which performs the specified function of the described component (e.g., that is functionally equivalent), even though not structurally equivalent to the exemplary embodiments. In addition, while a particular feature may have been disclosed with respect to only one embodiment, such feature may be combined with one or more other features as may be desired and advantageous for any given or particular application.

What is claimed is:

1. A lighting assembly, comprising:
a light source;
a light guide comprising a light input edge adjacent the light source, opposed major surfaces between which light input at the light input edge propagates by total internal reflection, a respective light output region associated with at least one of the major surfaces and a transition region between the light input edge and the light output region; and
a spectrum adjuster at the transition region to modify the spectrum of a portion of the light within the light guide, the spectrum adjuster comprising a transparent substrate and a spectrum-adjusting region coupled to the transparent substrate, the spectrum-adjusting region comprising spectrum-adjusting material having a spectrum-adjusting property;
wherein the spectrum adjuster is variably positionable relative to the light input edge of the light guide and relative to the light source to vary a position of the spectrum-adjusting region on which light from the light source is incident to achieve a desired spectrum of the light within the light guide.

2. The lighting assembly of claim 1, wherein:
the spectrum adjuster is variably positionable relative to the light guide to vary a portion of the light emitted by the light source incident thereon, and
a remainder of the light bypasses the spectrum adjuster and mixes with the light from the spectrum adjuster to achieve the desired spectrum of the light within the light guide.

3. The lighting assembly of claim 2, wherein the spectrum adjuster is variably positionable within an opening in the transition region.

4. The lighting assembly of claim 3, wherein the spectrum adjuster comprises a spectrum-adjusting element coupled to the transparent substrate having a cross-sectional shape substantially corresponding to a cross-sectional shape of the opening in the transition region.

5. The lighting assembly of claim 4, wherein the transparent substrate is rotatably mounted within the opening in the transition region to vary the orientation of the spectrum-adjusting element relative to the direction of the light path within the transition region to vary the effect of the spectrum adjuster on the spectrum of the light within the light guide.

6. The lighting assembly of claim 5, additionally comprising a gap between the transparent substrate and the opening in the transition region in which the spectrum adjuster is rotatably mounted, wherein the gap is filled with a fluid having an index of refraction closely matching indices of refraction of the transparent substrate and the light guide.

7. The lighting assembly of claim 6, further comprising a seal between the transparent substrate and the light guide at the opening for containing the index matching fluid within the opening.

8. The lighting assembly of claim 1, further comprising an adjustment mechanism to variably position the spectrum adjuster relative to the light guide.

9. The lighting assembly of claim 8, wherein the position is a rotational position.

10. The lighting assembly of claim 8, further comprising a light sensor to measure the spectrum of the light emitted from the light source.

11. The lighting assembly of claim 10, further comprising a comparator for comparing the measured spectrum of the light emitted from the light source to a target spectrum of light, and a controller for controlling operation of the adjustment mechanism to position the spectrum adjuster as needed to obtain the target spectrum of light within the light guide.

12. The lighting assembly of claim 8, further comprising a light sensor to measure the spectrum of the light within or extracted from the light output region of the light guide.

13. The lighting assembly of claim 12, further comprising a comparator for comparing the measured spectrum of the light within or extracted from the light output region of the light guide to a target spectrum of light, and a controller for controlling operation of the adjustment mechanism to position the spectrum adjuster as needed to obtain the target spectrum of light from the light output region of the light guide.

14. The lighting assembly of claim 1, wherein the spectrum-adjusting material is a color-attenuating material for attenuating one or more wavelengths of the light within the light guide.

15. The lighting assembly of claim 14, wherein the color-attenuating material has a varying color-attenuating property based on position in the spectrum-adjusting region.

16. The lighting assembly of claim 1, wherein the spectrum-adjusting material is a wavelength-shifting material.

17. The lighting assembly of claim 16, wherein the wavelength-shifting material comprises a phosphor material.

18. The lighting assembly of claim 1, wherein the wavelength-shifting material has a varying wavelength-shifting property based on position in the spectrum-adjusting region.

19. The lighting assembly of claim 1, wherein:
the spectrum adjuster comprises a non-spectrum-adjusting region adjacent the spectrum-adjusting region, the non-spectrum-adjusting region containing no operably-effective amount of spectrum-adjusting material, and the spectrum adjuster is variably positionable to vary the spectrum-adjusting region and the non-spectrum-adjusting region on which the portion of the light within the transition region is incident to vary the spectrum of the light within the light guide.

20. The lighting assembly of claim 19, wherein:
the spectrum adjuster comprises an additional spectrum-adjusting region of spectrum-adjusting material having a spectrum-adjusting property that is different from the spectrum-adjusting property of the spectrum-adjusting region, and
the spectrum adjuster is variably positionable to vary the spectrum-adjusting region, the additional spectrum-adjusting region, and the non-spectrum-adjusting region on which the portion of the light within the transition region is incident to vary the spectrum of the light within the light guide.

21. The lighting assembly of claim 20, wherein the non-spectrum-adjusting region is between the spectrum-adjusting region and the additional spectrum-adjusting region.

22. The lighting assembly of claim 1, wherein:
the spectrum adjuster comprises an additional spectrum-adjusting region of spectrum-adjusting material having a spectrum-adjusting property that is different from the spectrum-adjusting property of the spectrum-adjusting region, and
the spectrum adjuster is variably positionable to vary the spectrum-adjusting region and the additional spectrum-adjusting region on which the portion of the light within the transition region is incident to vary the spectrum of the light within the light guide.

23. The lighting assembly of claim 1, wherein the spectrum adjuster comprises a coating of spectrum-adjusting material applied to selected areas of an exterior surface of the transition region.

24. The lighting assembly of claim 23, wherein the coating is on stickers that are applied to the selected areas of the exterior surface of the transition region.

25. The lighting assembly of claim 24, wherein one or more of placement, size and number of stickers that are applied to the exterior surface of the transition region are selected to achieve the desired spectrum of the light within the light guide.

26. The lighting assembly of claim 23, wherein:
the coating is applied to selected areas of a surface of a reflector that optically contacts the exterior surface of the transition region,
the coating is made of a material that absorbs or wavelength shifts specific wavelengths of the light incident on the coating, and
the reflector reflects the light incident on non-coated portions of the surface of the reflector.

27. The lighting assembly of claim 26, wherein the reflector is variably positionable with respect to the exterior surface of the transition region to vary the amount and placement of the coating contacting the exterior surface of the transition region to achieve the desired spectrum of light within the light guide.

28. The lighting assembly of claim 1, wherein the spectrum adjuster comprises a color filter.

29. The lighting assembly of claim 1, wherein the spectrum adjuster comprises a substrate with a dielectric coating.

30. The lighting assembly of claim 1, wherein the spectrum adjuster comprises a dichroic mirror.

31. The lighting assembly of claim 1, wherein the spectrum adjuster comprises a polychroic mirror.

32. The lighting assembly of claim 1, wherein a portion of the spectrum adjuster comprises a neutral density filter.

33. The lighting assembly of claim 1, wherein the spectrum adjuster is one of a plurality of spectrum adjusters that collectively achieve the desired spectrum of the light within the light guide.

34. The lighting assembly of claim 1, wherein the light source is a solid state light emitter.

35. The lighting assembly of claim 34, wherein the solid state light emitter is a light emitting diode.

36. The lighting assembly of claim 1, wherein the spectrum-adjusting region tapers in width over at least a portion of its length to vary the extent to which a portion of the light incident on the spectrum-adjusting region is modified.

37. The lighting assembly of claim 1, wherein the spectrum adjuster is variably positionable along a direction parallel to its length.

38. The lighting assembly of claim 1, wherein the spectrum adjuster is located between the light source and the light input edge of the light guide.

39. The lighting assembly of claim 1, wherein there are a plurality of laterally spaced light sources adjacent the light input edge, and the spectrum adjuster comprises a plurality of laterally spaced spectrum-adjusting regions coupled to the transparent substrate, wherein each of the spectrum-adjusting regions is associated with a respective one of the plurality of laterally spaced light sources.

* * * * *